United States Patent
Choi et al.

(10) Patent No.: US 8,949,313 B2
(45) Date of Patent: Feb. 3, 2015

(54) MOBILE TERMINAL AND METHOD FOR CONTROLLING FUNCTION USING CONTENTS

(75) Inventors: Kwang-Cheol Choi, Suwon-si (KR); Dong-Gon Kim, Gwacheon-si (KR)

(73) Assignee: Samsung Electronics Co., Ltd (KR)

( * ) Notice: Subject to any disclaimer, the term of this patent is extended or adjusted under 35 U.S.C. 154(b) by 932 days.

(21) Appl. No.: 12/193,388

(22) Filed: Aug. 18, 2008

(65) Prior Publication Data

US 2009/0049121 A1    Feb. 19, 2009

(30) Foreign Application Priority Data

Aug. 18, 2007  (KR) .............................. 2007-0083086
Sep. 20, 2007  (KR) .............................. 2007-0095829
Dec. 20, 2007  (KR) .............................. 2007-0134319

(51) Int. Cl.
*G06F 15/16* (2006.01)
*H04M 1/725* (2006.01)

(52) U.S. Cl.
CPC ...... *H04M 1/72525* (2013.01); *H04M 1/72544* (2013.01)
USPC ....................................................... 709/203

(58) Field of Classification Search
CPC .................. H04M 1/72544; H04M 1/72525
USPC ....................................................... 709/203
See application file for complete search history.

(56) References Cited

U.S. PATENT DOCUMENTS

| 2006/0094360 | A1* | 5/2006  | Jung et al.    | 455/41.2 |
| 2006/0195366 | A1* | 8/2006  | Clayton et al. | 705/26   |
| 2007/0281664 | A1* | 12/2007 | Kaneko et al.  | 455/410  |
| 2007/0282858 | A1* | 12/2007 | Arner et al.   | 707/10   |

FOREIGN PATENT DOCUMENTS

| KR | 1020050080714 | 8/2005 |
| KR | 1020060026306 | 3/2006 |
| KR | 1020070018197 | 2/2007 |

* cited by examiner

*Primary Examiner* — Maceeh Anwari
(74) *Attorney, Agent, or Firm* — The Farrell Law Firm, P.C.

(57) ABSTRACT

A mobile terminal and a method for controlling a function of the mobile terminal using contents are disclosed. The contents are authored to include function control information related to the function of the mobile terminal desired to be controlled. The mobile terminal downloads the contents and registers the function desired to be controlled included in the contents to a service table. The application of the mobile terminal does not execute the called function as it is if the predetermined function is called, but identifies if the called function is registered in the service table. If the called function is registered, the application cancels the existing execution routine for the called function and requests the contents player of the service related to the called function. Then, the contents player controls the called function according to a method programmed in the contents.

18 Claims, 14 Drawing Sheets

MOBILE TERMINAL AND METHOD FOR CONTROLLING FUNCTION USING CONTENTS

PRIORITY

This application claims priority under 35 U.S.C. §119(a) to applications entitled "Mobile Terminal and Method for Controlling Function using Contents" filed in the Korean Intellectual Property Office on Aug. 18, 2007, Sep. 20, 2007, and Dec. 20, 2007 and assigned Serial Nos. 2007-83086, 2007-0095829, and 2007-0134319, the contents of which are incorporated herein by reference.

BACKGROUND OF THE INVENTION

1. Field of the Invention

The present invention relates to controlling a function of a mobile terminal, and more particularly, to a mobile terminal and a method for controlling a function of the mobile terminal using contents.

2. Description of the Related Art

Mobile terminals have increased in popularity due to their convenient portability. Due to the fact that the use of mobile terminals has increased significantly, a service provider (a terminal producer) has developed various services for securing many users. The mobile terminal includes a service that enables the user to enjoy games by downloading game contents. These game contents are the application files executed by a Virtual Machine (VM) mounted on the mobile terminal or by an exclusive player. The application files are operated in a specific platform, such as the VM or the exclusive player. Further, the game contents are independently operated without being connected with other applications or other contents, and can use only a device or a driver provided from the specific platform, such as the VM or the exclusive player.

Referring to FIG. 1, showing a general interior construction of the mobile terminal, if a call reception 10 exists through an antenna ANT and a wireless unit 102, a controller 100 informs a user of the call reception through a voice processing unit 110 while displaying a transmission number on a display unit 108 according to an execution routine for processing a function of the call reception. That is, a signal of the call reception 10 is processed in a platform of the mobile terminal which is connected with various signals and functions and manages them in the mobile terminal, and the platform of the mobile terminal executes a menu related to the call reception 10, serving as a corresponding application. A signal 20 informs a contents player 104 when the contents are received from the outside, and a signal 20 is used to display information that the contents is received from the outside in order for a user to easily recognize.

Further, the contents 106 are operated in a specific platform, such as a contents player 104 capable of executing the contents 106, and are separately operated from the application processed in the general platform of the general mobile terminal. Furthermore, the conventional mobile terminal does not have an interface for connecting the contents 106 with the general application or controlling them.

The contents producer has manufactured the contents without considering the characteristics or the use method of the mobile terminal executing the contents. In this way, the contents can be operated only in the specific platforms capable of executing the contents. Therefore, it cannot be helped that the platforms capable of executing the contents are independently operated. In this respect, there has been a problem in that the practical application of using a unique function of the mobile terminal, other applications, or other function, or connecting with each other cannot be achieved.

SUMMARY OF THE INVENTION

The present invention has been made to address at least the above problems and/or disadvantages and to provide at least the advantages described below. Accordingly, a aspect of the present invention provides a terminal and a method for controlling a function of the terminal in which contents use or are connected with a unique function or other application of the mobile terminal when the contents are executed in a mobile terminal or other function, to be operated.

Another aspect of the present invention provides a terminal and a method for controlling contents related to a called function according to calling a predetermined function in the mobile terminal through the communication between a platform executing the contents with a platform of a function or an application of the mobile terminal.

An additional aspect of the present invention provides a terminal and a method for controlling a function of a mobile terminal using a program included in the contents according to the program when the contents are executed.

According to one aspect of the present invention, a mobile terminal is provided for controlling a function using contents. The mobile terminal includes a contents player for executing contents, and at least one application for performing at least one predetermined function. The mobile terminal also includes a service table to which a function of the mobile terminal included in the contents is registered if the contents are installed. If the predetermined function is called, the application or the contents related to the called function are executed according to whether the called function is registered in the service table.

According to another aspect of the present invention, a mobile terminal is provided. The mobile terminal includes a contents player for executing contents, and at least one application for executing an execution routine according to the call. The mobile terminal also includes a service manager for calling a predetermined application according to a program included in the contents upon installing the contents.

According to an additional aspect of the present invention, a mobile terminal is provided that includes a contents player for executing contents, and a service manager for transmitting predetermined information generated in the mobile terminal to the contents player according to a program included in the contents upon installing the contents.

According to a further aspect of the present invention, a mobile terminal is provided that includes a service manager for transmitting and receiving signals between a contents player and at least one application, and the contents player for requesting predetermined information from a service manager when a request for predetermined information is made upon executing contents, and receiving the requested information. The mobile terminal also includes a memory for storing information, and an application for providing the requested information in the information stored in the memory if the request for the predetermined information is made. The service manager requests providing the requested information by the application if the request for the predetermined information is made from the contents player and provides the received information to the contents player if the information is provided from the application.

According to another aspect of the present invention, a method is provided for controlling a function in a mobile terminal using contents. A function included in the contents is registered to a service table when the contents are installed.

An application or the contents related to a called function are executed according to whether the called function is registered in the service table.

According to another additional aspect of the present invention, a method is provided for controlling a function in a mobile terminal using contents. The contents are installed if a request for installing the contents is made. A predetermined application is called according to a program included in the contents upon installing the contents.

According to a further aspect of the present invention, a method is provided for controlling a function of a mobile terminal having a contents player capable of executing the contents using the contents. The contents are installed in the contents player if a request for installing the contents is made. Predetermined information generated in the mobile terminal according to a program included in the contents is received upon installing the contents and the contents are executed using the predetermined information.

According to another aspect of the present invention, a method is provided for controlling a function of a mobile terminal having a contents player capable of executing the contents using the contents. Requested contents are executed if a request for the execution of the contents is made. Requested information is provided in information previously stored in the mobile terminal if a request for predetermined information is made upon executing the contents.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF THE PREFERRED EMBODIMENTS

Figure 1:
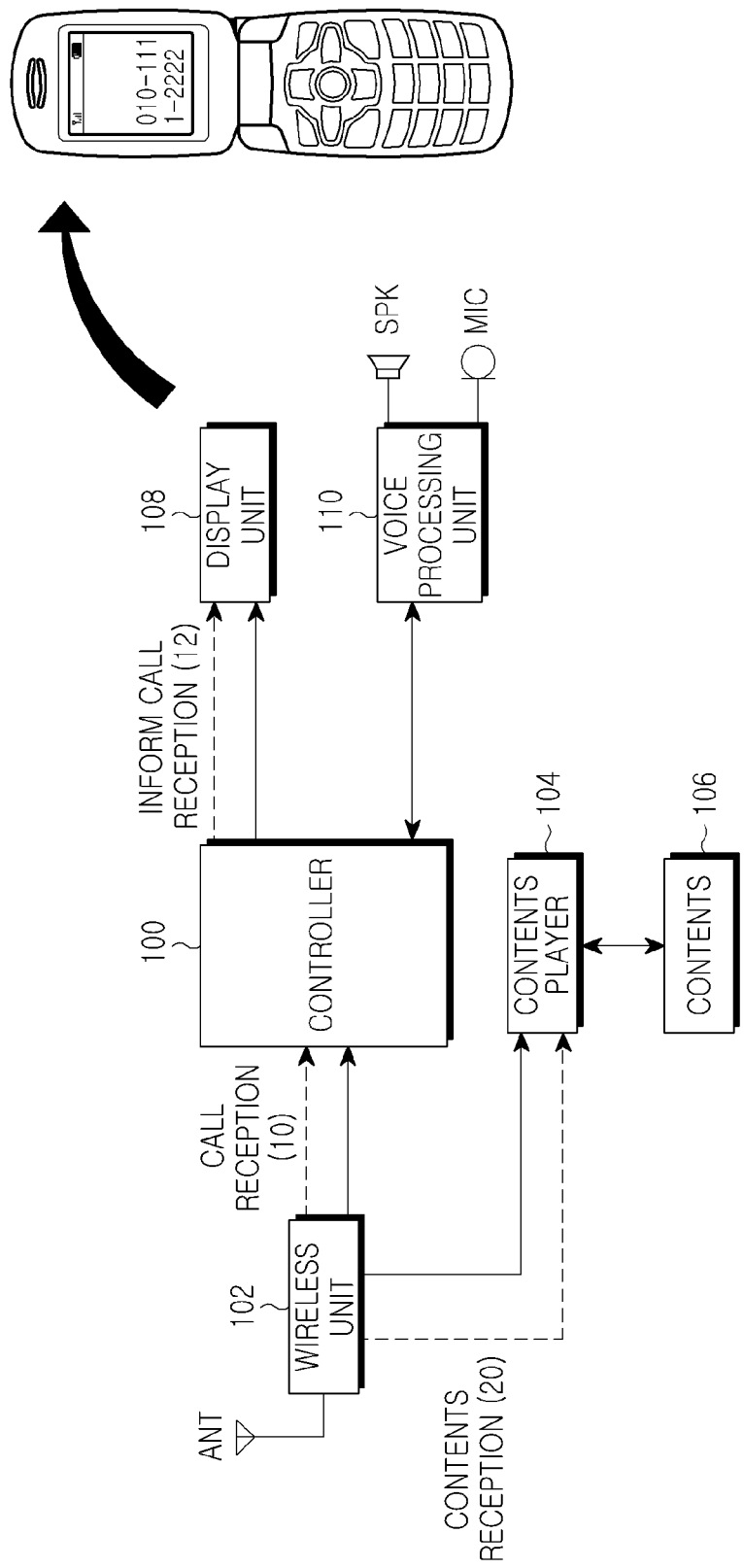
FIG. 1 is a diagram illustrating a conventional mobile terminal.

Preferred embodiments of the present invention are described in detail with reference to the accompanying drawings. Similar components are designated by similar reference numerals although they are illustrated in different drawings. Detailed descriptions of constructions or processes known in the art may be omitted to avoid obscuring the subject matter of the present invention rather unclear.

First, a method for authoring and downloading contents according to the present invention can be implemented by downloading the contents authored in a contents authoring device, such as a PC, or through the Internet to a mobile terminal. The method is also implemented by downloading the contents provided from a service provider or a mobile terminal manufacturer over wire or wirelessly. Hereinafter, a person authoring the contents, such as a user of the mobile terminal, a service provider, or the mobile terminal manufacturer is referred to as a contents author.

Figure 2:
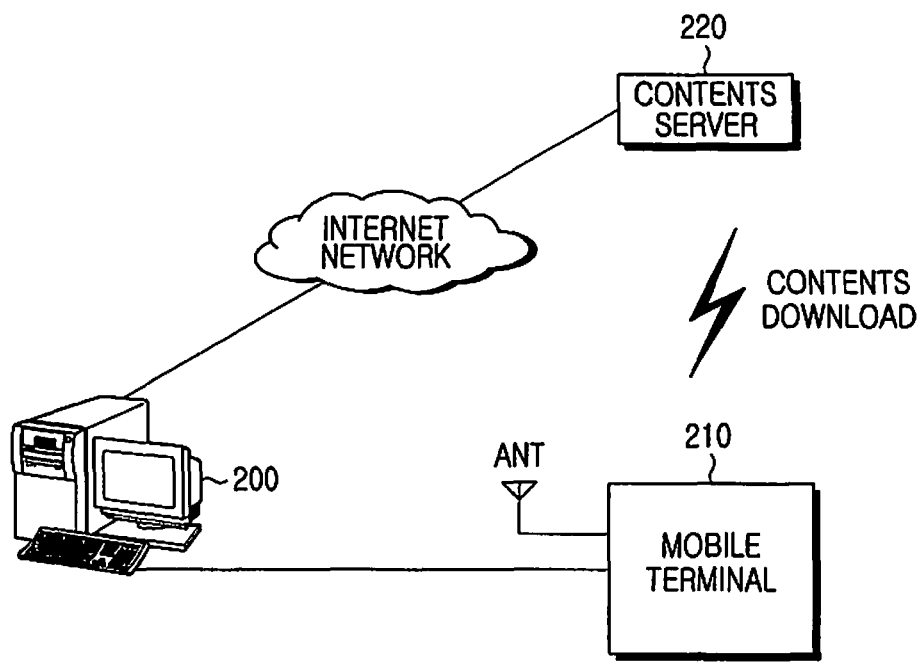
FIG. 2 is a diagram illustrating a contents downloading system according to an embodiment of the present invention.

A contents downloading system according to an embodiment of the present invention is described with reference to FIG. 2. The contents downloading system includes a contents authoring device 200, a contents server 220, and a mobile terminal 210.

The contents authoring device 200 serves an authoring device capable of authoring the contents, such as a PC, and has a modulated authoring tool related to a control of a function of a cellular phone in order not to cause errors in the operation of the mobile terminal.

The contents author can author the contents having a function capable of controlling a predetermined function of the mobile terminal using the contents authoring device 200. That is, the contents author can author the contents including a program for controlling the predetermined function of the mobile terminal using the contents authoring device 200. The contents author may be the service provider or the mobile terminal manufacturer. The program included in the contents can include at least one function of the mobile terminal desired to be controlled, the details of each function, and execution information for executing the function. As such, the contents author can author the contents or a user can directly author the contents. In particular, in a case of User Created Contents (UCC) directly produced by the user of the mobile terminal 210, the user can produce a program controlling the function of the mobile terminal more suitable to his/her taste, thereby making the program more effective. Further, the contents authoring device 200 uploads the authored contents to the contents server 220 through the Internet network. In another embodiment, the contents authored in the contents authoring device 200 are not uploaded to a predetermined server, but are directly downloaded to the mobile terminal 210. If the contents authored in the contents authoring device 200 are directly transmitted to the mobile terminal 210, the contents server 220 shown in FIG. 2 is not required. In the meantime, the contents server 220 stores the authored contents. An identifier for discriminating the contents can be stored together with the authored contents upon storing. If the contents server 220 receives a request for downloading the predetermined contents from the mobile terminal 210, the contents server 220 provides the mobile terminal 210 with the corresponding contents. The contents can be provided over wire or wirelessly.

If the mobile terminal 210 downloads and executes the contents, the mobile terminal 210 controls a predetermined function of the mobile terminal according to the program included in the contents. In the exemplary embodiment of the present invention, the mobile terminal 210 is exemplified as a device for downloading the contents and controlling the function of the terminal through the downloaded contents, but every mobile terminal can serve the above device. In this embodiment, the mobile terminal is exemplified as the device for downloading the contents and controlling the function of the mobile terminal through the downloaded contents, but every mobile terminal can serve for the device.

Figure 3:
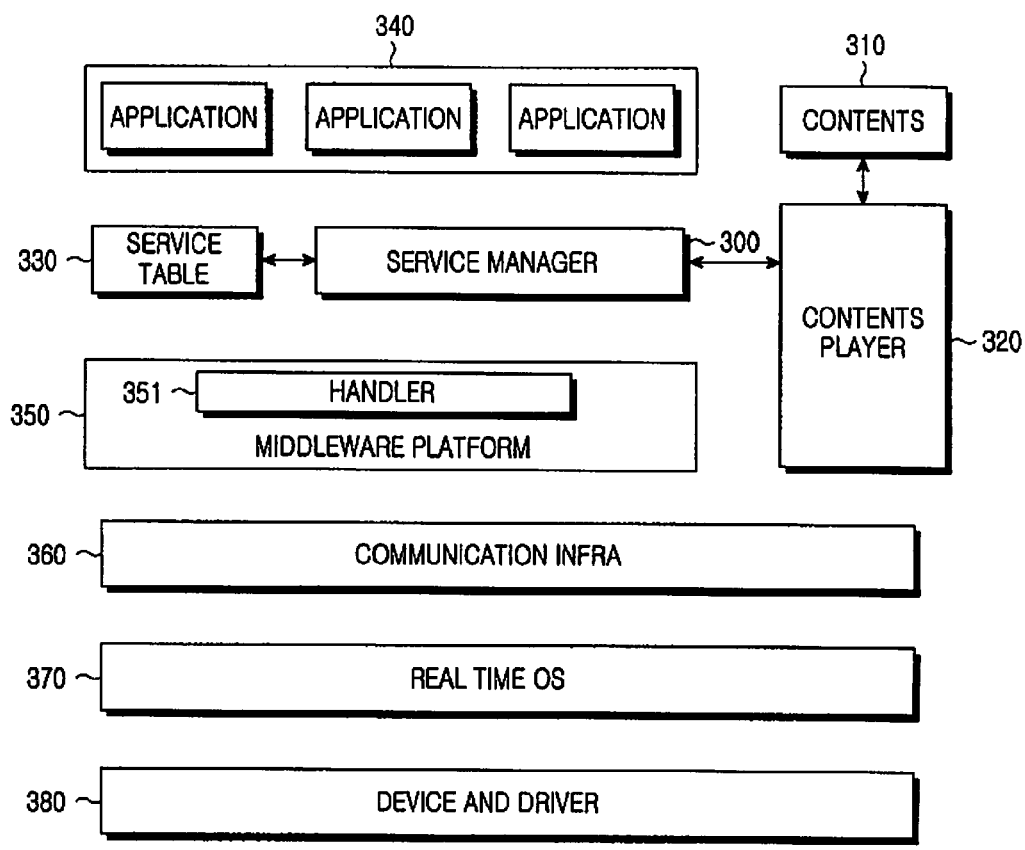
FIG. 3 is a diagram illustrating software architecture of a mobile terminal according to an embodiment of the present invention.

The software architecture of the mobile terminal 210 is described with reference to FIG. 3. The software architecture of the mobile terminal 210 according to the embodiment of the present invention includes devices, such as a memory, keys, a camera, and an LCD, a middleware platform 350 including a driver layer 380, a real time Operation System OS layer 370, and a communication infra layer 360, and multiple applications 340 for executing the function of the mobile terminal. Further, the software architecture of the mobile terminal 210 includes the contents 310 including the function control information for controlling the function of the mobile terminal and a contents player 320 for executing the contents. In the embodiment, the contents player 320 is exemplified as a device for executing the contents 310, but a Virtual Machine (VM) can serve the device. The middleware platform 350 connects the applications to exchange the data with each other. In particular, the mobile terminal 210 of the present invention includes a service manager 300 serving as the interface for communicating between the applications 340 and the contents player 320. Furthermore, the software architecture of the mobile terminal 210 includes a service table 330 registering a service list including the functions included in the contents.

Hereinafter, the control of the operation of the mobile terminal 210 according to the program included in the contents, when the contents are installed in the mobile terminal shown in FIG. 3, will be described according to an embodiment of the present invention.

The embodiments of the present invention include the embodiments of executing the specific contents instead of a called function according to the call of the predetermined function in the mobile terminal, and the embodiments of controlling the predetermined operation of the mobile terminal according to the program included in the contents regardless of the function call upon executing the contents.

The execution of the specific contents substituting the called function according to the predetermined function call are described according to an embodiment of the present invention.

If the contents including the program controlling the predetermined function of the mobile terminal are installed by the contents player 320 before the predetermined function is called, the contents player 320 generates a service list message using a code of the program included in the contents and transmits the generated service list message to the service manager 300. The service manager 300 configures the service table 330. The operation of configuring the service table 330 is described in more detail with reference to FIGS. 4 and 5. The contents player 320 performs a service list transmission command according to the program included in the contents upon installing the contents in step 400, and generates the function of the terminal included in the contents desired to be controlled as the service list. That is, the command for setting the table is programmed in the authored contents and the contents player 320 only executes the command. As such, the contents player 320 generates information desired to process the application or the function of the mobile terminal 210 according to the execution of the contents player 320 as the service list.

In the embodiments of the present invention, the function and the service are described as an identical meaning. For example, if the user desires to execute a code "if(phone number==010-222-2345)" for receiving a phone number reception service, the contents player 320 should execute the code of "IPC_send(service List add, receive a call, 010-222-2345)" in advance, and register "call reception function 010-222-2345) to the list of the service table 330. The code of "IPC_send(service List add, receive a call, 010-222-2345)" takes a role of transmitting the service list message having a format shown in FIG. 5B to the service manager 300.

Figure 5A:
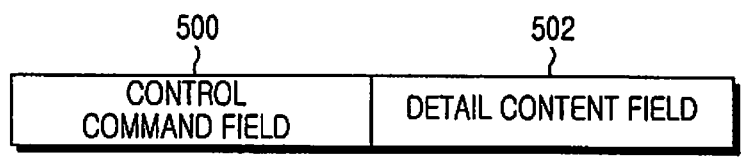
FIGS. 5A and 5B are diagrams illustrating an example of a service message format according to an embodiment of the present invention.
Figure 5B:

According to the service list transmission command, the contents player 320 generates the identified functions as the service list. Then, the contents player 320 transmits the service list to the service manager 300 in step 402. The contents player 320 and the service manager 300 are different platforms so that the contents player 320 transmits the command in the form of Inter Process Communication (IPC), in which the contents player 320 can transmit the command using a channel, such as TCP/UDP, by adding the interface function to the VM, or by sharing a file or memory. Further, the service list can be transmitted using a message format having a control function field 500 and a detail contents field 502 shown in FIG. 5A. The control function field 500 can include a function control command of the mobile terminal, and the detail contents field 502 can include the details of the function control command. For example, if the program in which picture A included in the contents is displayed on a screen when calling from the phone number 010-222-2345 is included in the contents as shown in FIG. 5B, the contents player 320 makes the function control field 504 to include a content of notifying the case where the call reception occurs and the details contents field 506 to include the content of transmitting the service list message including the phone number 010-222-2345 to the service manager 300 in step 402.

After receiving the transmitted service list in step 402, the service manager 300 sets the service table 330 using the service list received in step 404. That is, the service manager 300 registers at least one function included in the service list to the service table 330. Further, the service table 330 can be implemented as a variable accessible in every related application or function.

Figure 4:
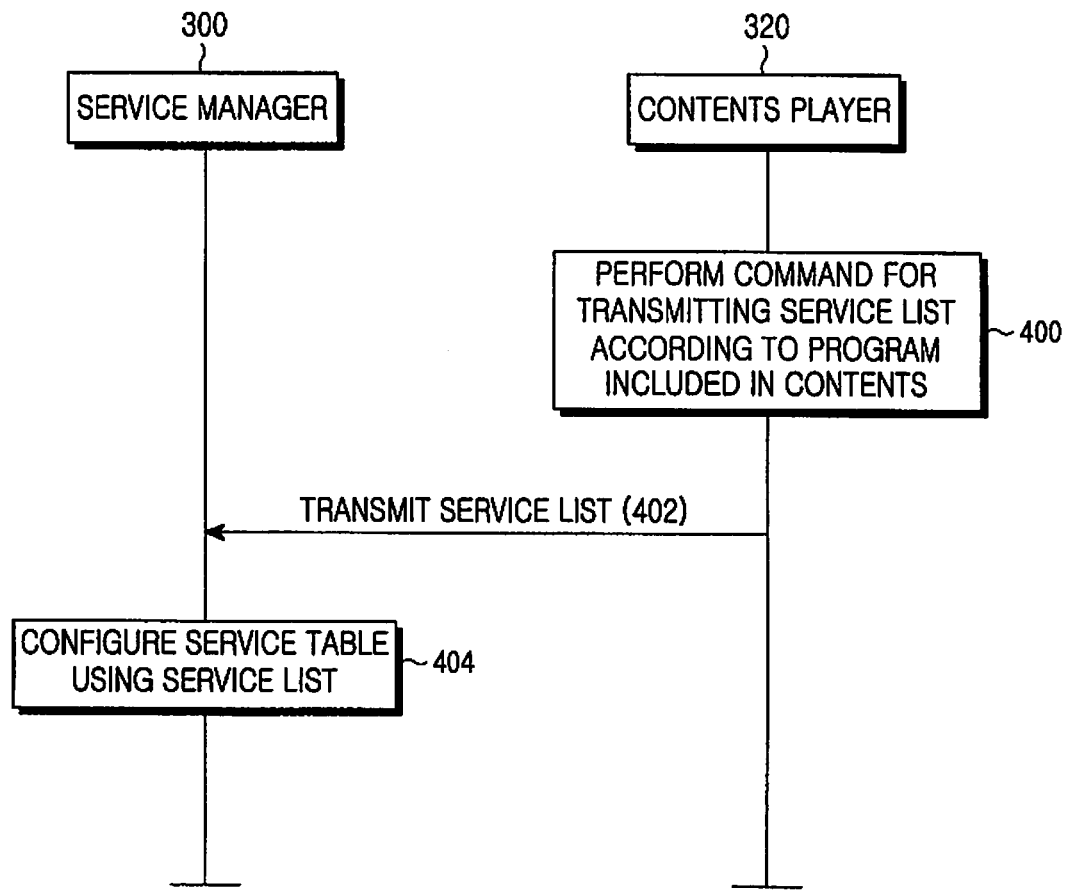
FIG. 4 is a diagram illustrating a signal flow in a process of configuring a service table according to an embodiment of the present invention.

The operation in which the mobile terminal configures the service table through the service manager 300 through the process shown in FIG. 4, and executes the contents according to the call of the predetermined function is further described. If the predetermined function is called, the mobile terminal executes the application or the contents according to whether or not the called function is registered in the service table. If the called function is registered, the contents related to the called function are executed by the contents player 320, and if the called function is not registered, the application related to the called function is executed.

Whether the called function is registered in the service table can be identified in the service manager 300 and also in the application 340. Hereinafter, two embodiments for a method for identifying whether the called function is registered are described. A first embodiment is described with reference to FIGS. 6 and 7, and a second embodiment is described with reference to FIGS. 8-10.

Figure 6:
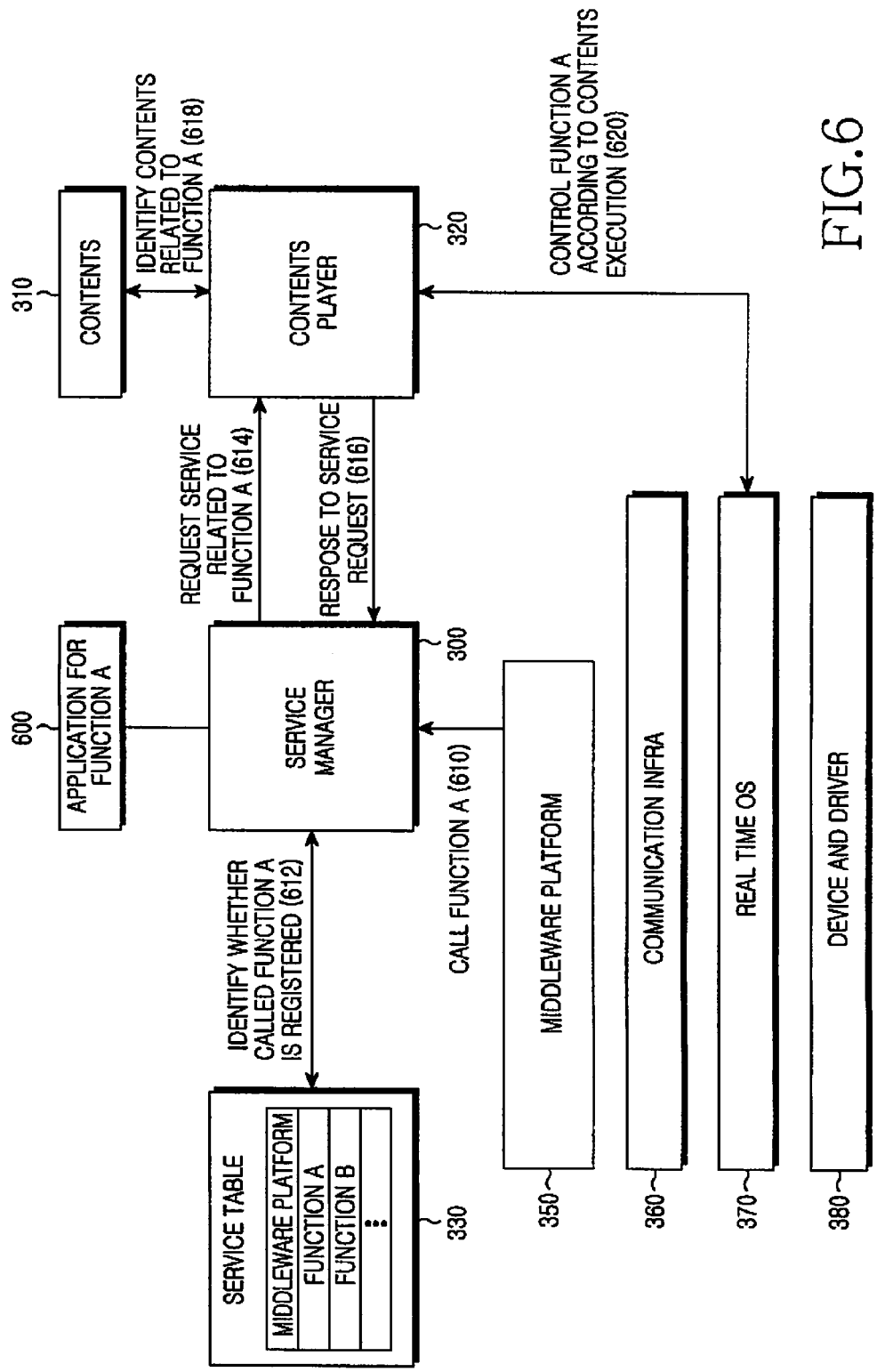
FIG. 6 is a diagram illustrating an inner construction of a mobile terminal for explaining an operation according to the call of a predetermined function according to a first embodiment of the present invention.

The structure of software of the mobile terminal shown in FIG. 6 is identical to that of FIG. 3, so a detailed description for each block is omitted, and the control of function A will be described. At this time, it is assumed that function A is previously registered in the service table 330 through the process shown in FIG. 4. In the embodiments of the present invention, the mobile terminal 210 requires the element capable of interfacing between a terminal platform executing the application and other programs and a specific platform executing the contents. The service manager 300 serves as this interface element.

Referring to FIG. 6, function A is called in the middleware platform 350 in step 610, the service manager 300 identifies whether the called function is registered in the service table 330 in step 612. At this time, function A is registered in the service table 330 so that the service manager 300 requests the service related to function A in step 614. The contents player 320 identifies the contents related to function A and executes the corresponding contents in step 618. That is, the contents related to function A are executed instead of the application related to function A. Then, function A is controlled according to the execution of the contents in step 620. Further, the contents player 320 transmits the response to the service related to function A requested in step 614 to the service manager 300 in step 616.

Figure 7:
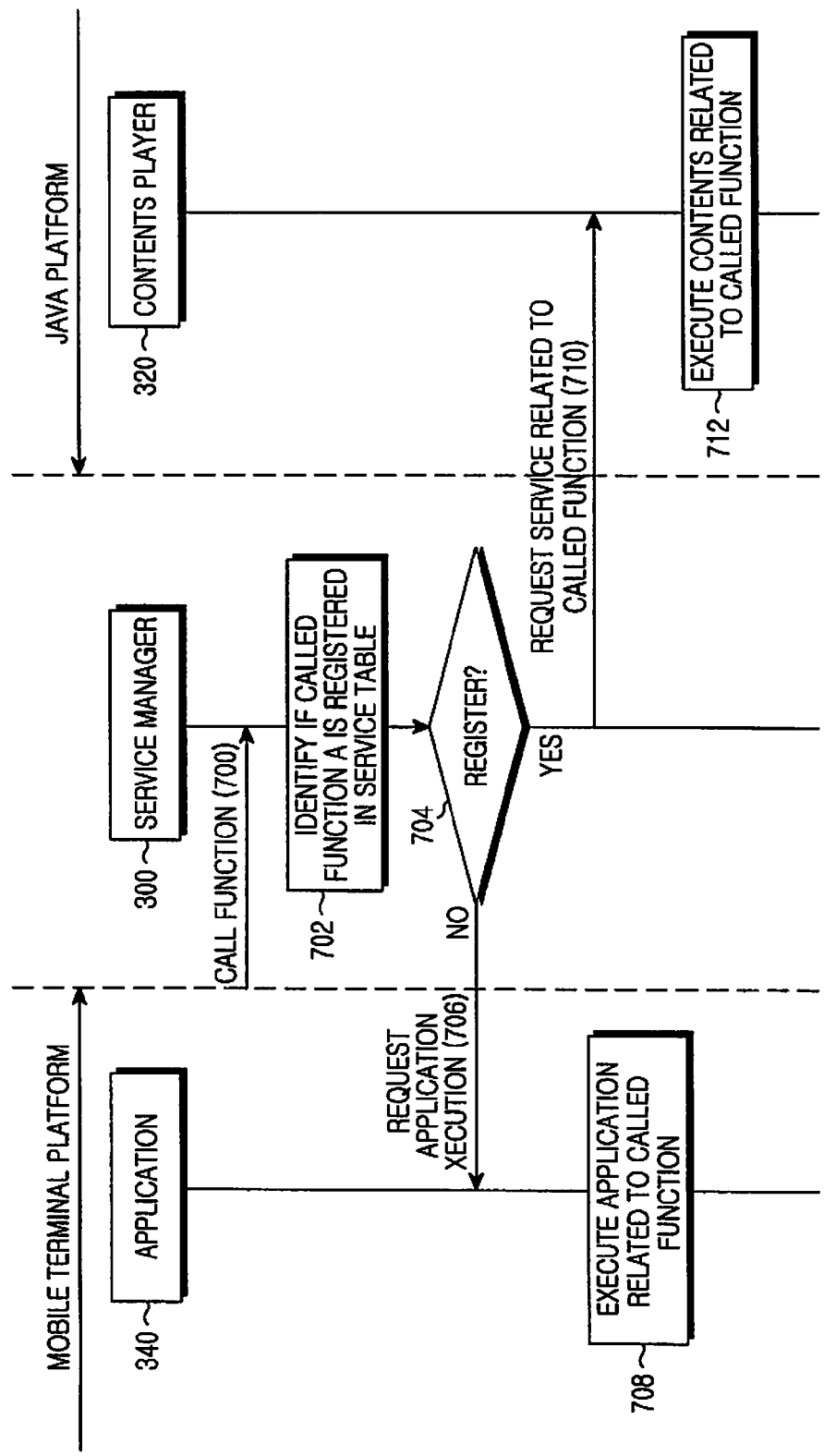
FIG. 7 is a diagram illustrating a signal flow in a process of controlling a function of a mobile terminal upon calling a predetermined function according to a first embodiment of the present invention.

The flow of the operation according to the call of the predetermined function according to the first embodiment is described with reference to FIG. 7.

If the predetermined function is called in step 700, the service manager 300 identifies whether the called function is registered in the service table 330 in step 702. If it is identified that the called function is registered in the service table 330 in step 704, the service manager 300 requests the service related to the called function in step 710. Then, the contents player 320 identifies the contents related to the called function according to the service request and executes the identified contents in step 712. However, if it is identified that the called function is not registered in the service table 330 in step 704, the service manager 300 requests the application 340 of executing the application related to the called function in step 706. Then, the application 340 receiving the execution request executes the application related to the called function in step 708.

Figure 8:
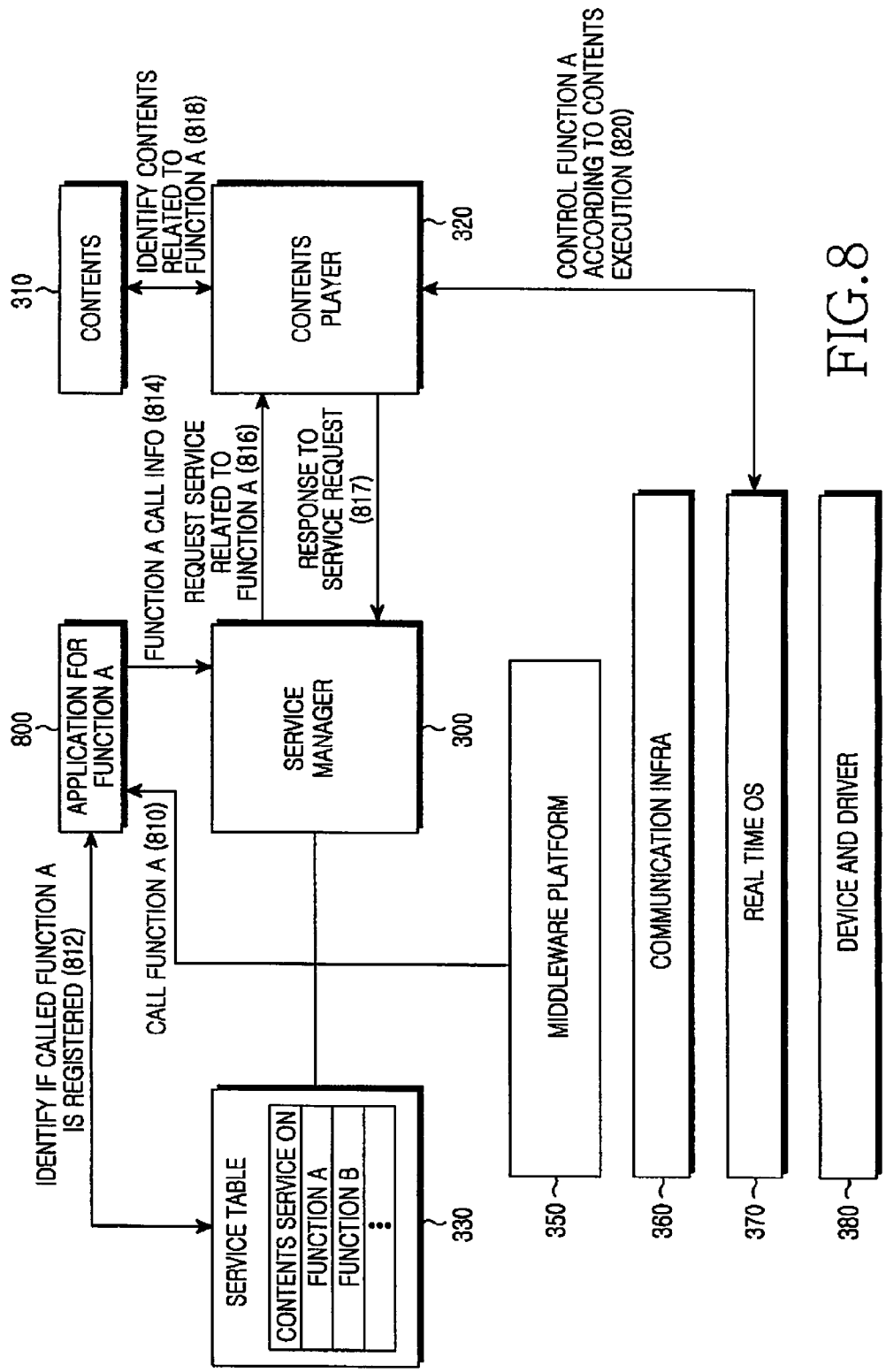
FIG. 8 is a diagram illustrating an inner construction of a mobile terminal for explaining an operation according to the call of a predetermined function according to a second embodiment of the present invention.

The software architecture of the mobile terminal shown in FIG. 8 is identical to that of FIG. 3 so that detailed description for each block will be omitted, and the control of function A will be described. It is assumed that function A is previously registered in the service table 330 through the process shown in FIG. 4. If function A is called in the middleware platform 350 in step 810, an application 800 related to called function A identifies whether called function A is registered in the service table 330 in step 812. At this time, function A is registered in the service table 330, so that the application 800 generally cancels an execution routine according to the call of function A and transmits call information of called function A to the service manager 300 in step 814. The service manager 300 requests the contents player 320 of the service related to function A in step 816. The contents player 320 identifies the contents related to function A and executes the corresponding contents in step 818. That is, the contents related to function A are executed instead of the application related to function A. Then, function A is controlled according to the execution of the contents in step 820. That is, the application 800 cancels the existing execution routine for called function A and requests the contents player 320 of the execution of the contents related to function A through the service manager 300. Further, the contents player 320 transmits a response to the service related to function A requested in step 816 to the service manager 300 in step 817. That is, in the second embodiment, when every application is executed in the mobile terminal 210, the application identifies whether the application itself is set in the service table 330.

Figure 9:
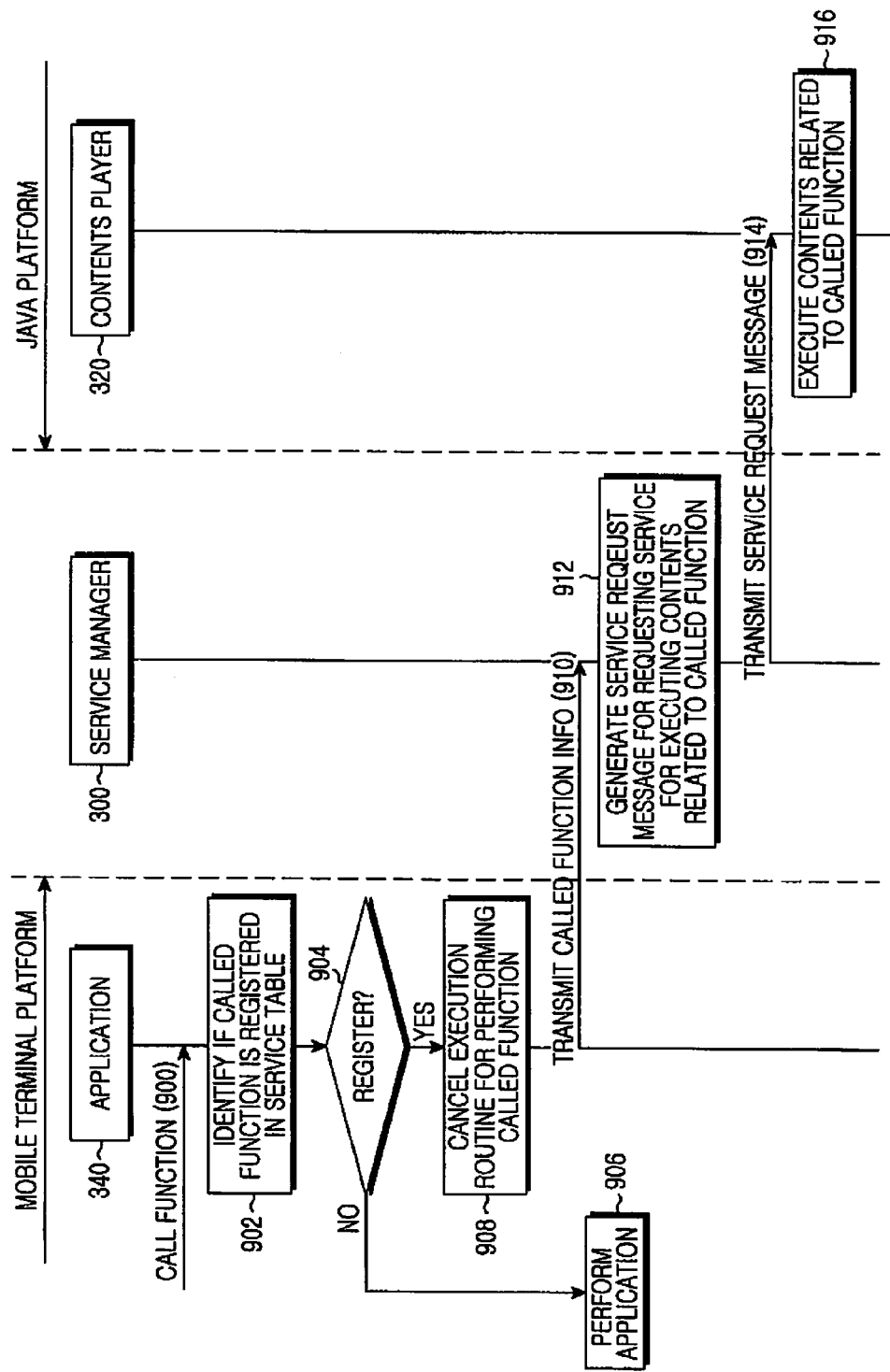
FIG. 9 is a diagram illustrating a signal flow in a process of controlling a function of a mobile terminal upon calling a predetermined function according to a second embodiment of the present invention.

The flow of the operation according to the call of the predetermined function according to the second embodiment of the present invention is described with reference to FIG. 9. If the predetermined function is called in step 900, the application 340 identifies if the called function is registered in the service table 330 in step 902. If it is identified that the called function is registered in the service table 330 in step 904, the application 340 proceeds to step 908, and if it is identified that the called function is not registered in the service table 330 in step 904, the application 340 performs the application in step 906. That is, the application 340 performs the function according to the execution routine for performing the called function. The application 340 cancels the execution routine for performing the called function in step 908 and transmits the called function information to the service manager 300 in step 910. The service manager 300 receiving the called function information generates the service request message for requesting the execution the contents related to the called function instead of the called function in step 912. Thereafter, the service manager 300 transmits the service request message to the contents player 320 in step 914. Then, the contents player 320 identifies the called function in the service request message, identifies the contents related to the identified call function, and executes the identified contents in step 916.

Figure 10:
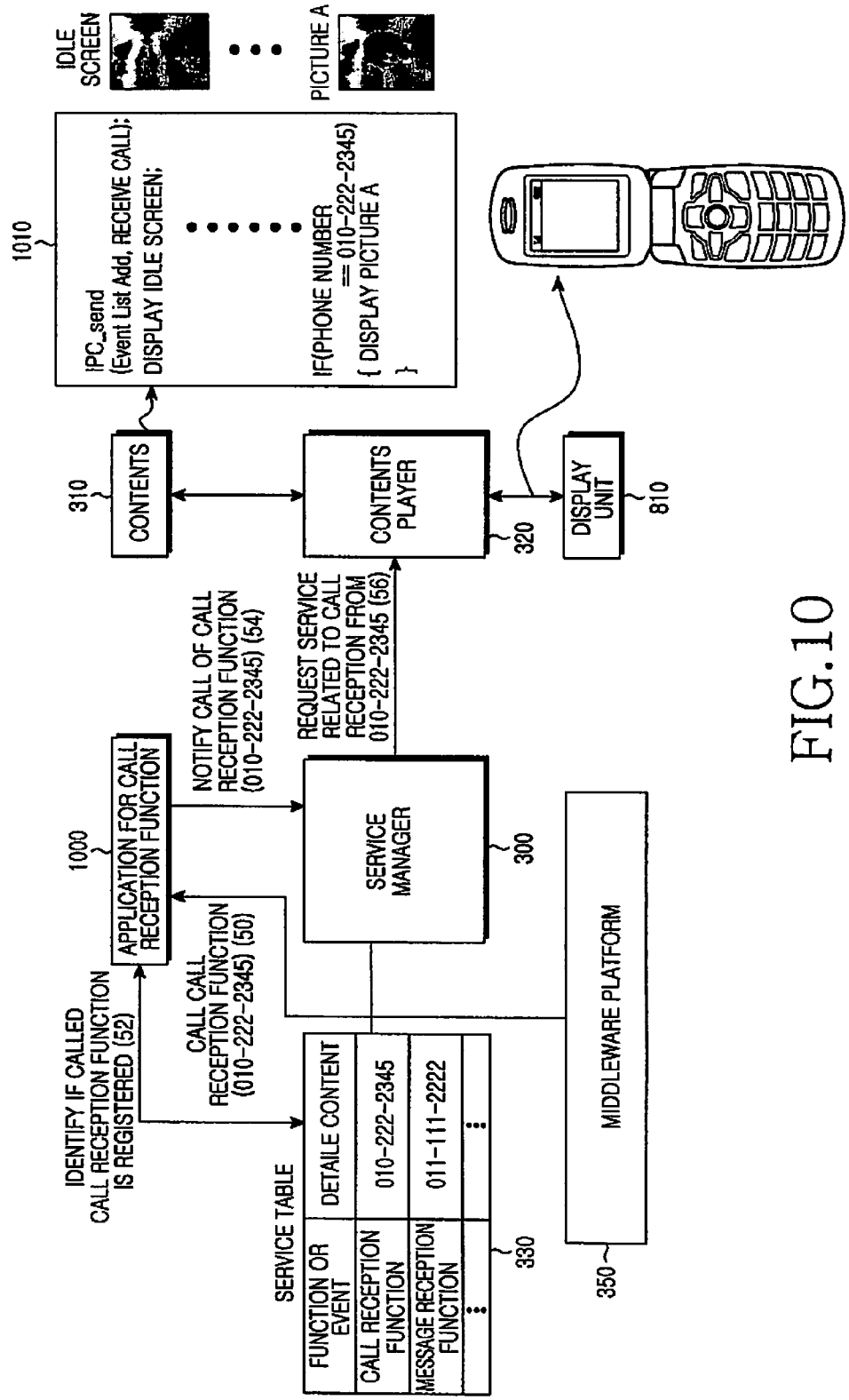
FIG. 10 is a diagram illustrating an inner construction of a mobile terminal for explaining an operation of controlling a function according to the call of a call reception function according to a second embodiment of the present invention.

According to the second embodiment, the predetermined called function is the call reception function, and an example of executing the predetermined contents when the call is received from a specific phone number will be described with reference to FIG. 10.

It is assumed that the program of the contents authored by the user is like reference number 1010. Referring to reference number 1010, the operation of the mobile terminal performed when the phone number in the "If" phrase is "010-222-2345" is described. Here, if the command "phone number" is used, the "call reception" application or function is registered in the service table upon executing the contents. If the mobile terminal 210 receives the call, the application 1000 receives the call from the phone number "010-222-2345" being received from the middleware platform 350 in step 50. The application 1000 identifies that the call reception function is registered in the service table 330 and the phone number "010-222-2345" is registered as the detailed contents in step 52. The application 1000 cancels the execution routine for the existing call reception, and notifies the service manager 300 of the call of the call reception function with respect to the phone number "010-222-2345" being called in step 54. The service manager 300 requests the contents player 320 of the service related to the call reception with respect to the phone number "010-222-2345" in step 56. The contents player 320 displays picture A on a display unit 810 according to a method programmed in the contents 310. That is, the contents 310 including the program authored with an authoring tool by the user substituting the call reception function for the phone number "010-222-2345" in the functions of a cellular phone are executed in the contents player 320. If the execution of the call reception function with respect to the phone number "010-222-2345" in the operating process of the cellular phone is requested, the existing call reception function is not executed as it is, but the operation designated by the contents player 320 is performed according to the method programmed in the contents.

Figure 11:
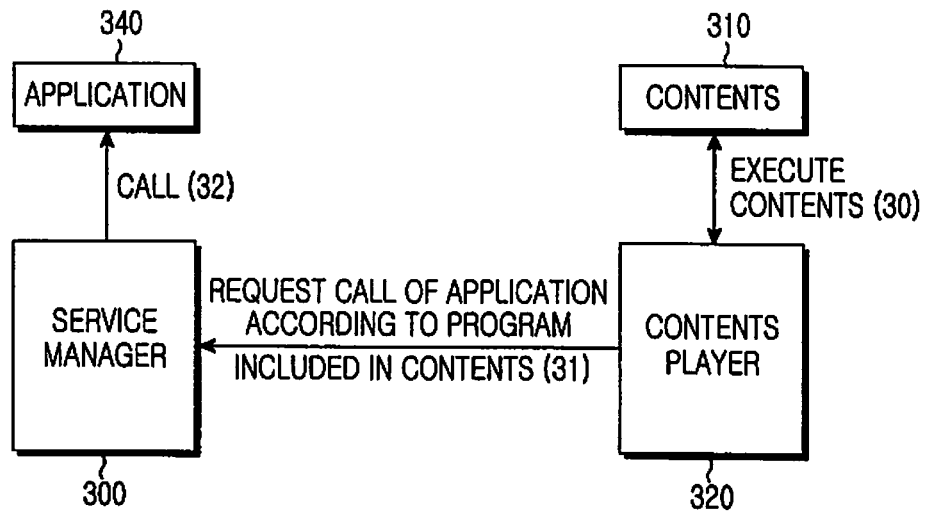
FIG. 11 is a diagram illustrating a flow of a signal transmitted/received between a service manager and a contents player upon executing the contents according to a third embodiment of the present invention.

In the third embodiment, if the contents are executed regardless of the call of the predetermined function, the predetermined application is called according to the program of the contents. The third embodiment of the present invention is described with reference to FIG. 11.

When the contents player 320 executes the contents 310 in step 30, the contents player 320 requests the service manager 300 of the call of the predetermined application according to the program included in the contents in step 31. Then, the service manager 300 calls the corresponding application 340 and executes the application in step 32. That is, in the third embodiment, the service manager 300 takes a role of directly calling the application of the mobile terminal.

For example, it is assumed that the user authors a congratulatory card as the contents by using the contents authoring device 200, in which the contents have a function capable of calling a specific person after the congratulatory card is executed, and then the replay of the moving image of the congratulatory card is finished. Thereafter, if the above-authored contents are downloaded to the mobile terminal 210 and the congratulatory card is executed in the mobile terminal 210, the moving image of the congratulatory card is replayed and then the call is made to a predetermined specific person. That is, even if the congratulatory card is the contents, the congratulatory card can control the function of the call of the mobile terminal.

Figure 12:
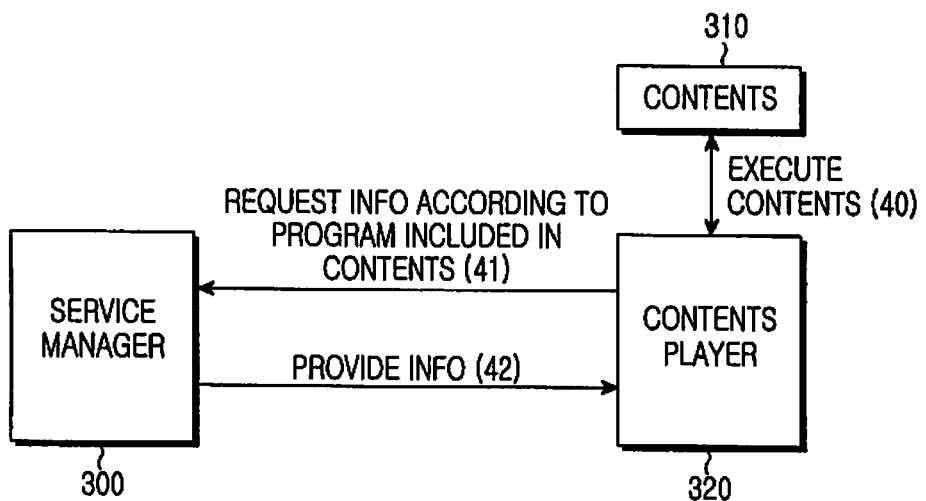
FIG. 12 is a diagram illustrating a flow of a signal transmitted/received between a service manager and a contents player upon executing the contents according to a fourth embodiment of the present invention.

In the fourth embodiment, the information generated in the mobile terminal according to the contents program upon executing the contents regardless of the predetermined function call is transmitted to the contents player 320. The fourth embodiment of the present invention is described with reference to FIG. 12.

Figure 13:
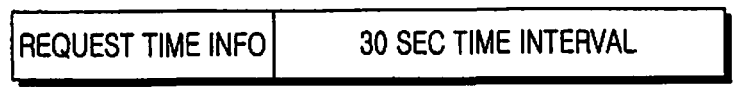
FIG. 13 is a diagram illustrating an example of a format of a request message transmitted from a contents player to a service manager upon executing the contents related to a clock design according to a fourth embodiment of the present invention.

When the contents player 320 executes the contents 310 in step 40, the contents player 320 requests the service manager 300 of providing the predetermined information according to the program included in the contents in step 41. Then, the service manager 300 provides the requested predetermined information to the contents player 320 in step 42. The format of the message requesting the predetermined information according to the program included in the contents can be a message format shown in FIG. 5A. If the time information of the mobile terminal is requested every 30 second time interval, the message having the format shown in FIG. 13, with a control function field 508 and a detail contents field 510, can be transmitted from the contents player 320 to the service manager 300.

For example, it is assumed that the user authors the contents related to a clock design using the contents authoring device 200, if the contents are executed and the contents player 320 can receive time information for every predetermined time interval. Thereafter, if the above authored contents are downloaded to the mobile terminal 210 and executed, the service manager 300 identifies the time information generated in the mobile terminal so as to transmit the generated time information to the contents player 320.

Figure 14:
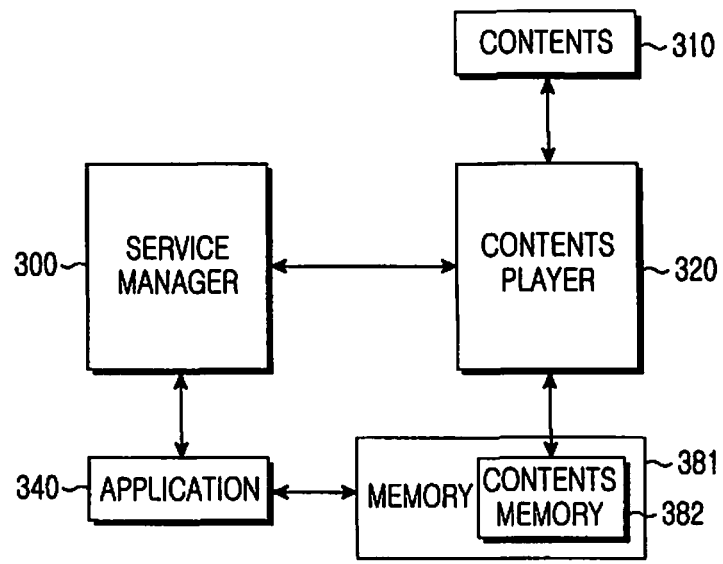
FIG. 14 is a diagram illustrating an inner construction of a mobile terminal for explaining an operation of executing the contents related to the image edit and modification according to a fourth embodiment of the present invention.

In this respect, the execution of the contents related to the image edit and modification will be specifically described with reference to FIG. 14. FIG. 14 is a diagram illustrating an inner construction of the mobile terminal 210 for explaining an operation of the image edit and modification when the contents are executed for image editing and modifying according to the fourth embodiment of the present invention. Here, the image edit and modification refer to operations such as color amendment, size reduction or enlargement, or composite of the image through the contents. It is assumed that the user authors the contents 310 for editing and modifying the image using the contents authoring device 200. If the contents 310 are downloaded to the mobile terminal 210 to be installed, and the request for processing the predetermined image is made from the user, the contents player 320 generates the request message for requesting the list of the image files stored in a memory 381 with the service manager 300. Then, the contents player 320 transmits the generated request message to the service manager 300. Thereafter, if the contents player 320 receives the response message including the requested image list from the service manager 300, the contents player 320 reads the image list from the received response message to display the read image list on the screen. If the user selects the predetermined image, the contents player 320 generates the request message for copying the selected image from the memory 381 to a contents memory 382 which the contents player 320 can access. Then, the contents player 320 transmits the generated request message to the service manager 300. If the contents player 320 receives a response message indicating a copy of the selected image is completed in the contents memory 382 from the service manager 300, the contents player 320 displays the image copied in the contents memory 382 on the screen of the mobile terminal 210. At this time, the displayed image can be illustrated as picture A of FIG. 10. Through the above, the user can edit and modify the selected image to the desired image. Further, if the request for storing the edited or modified image is made from the user, the contents player 320 stores the edited or modified image to the contents memory 382 and the memory 381. Then, if the image is stored to the memory 381, the contents player 320 deletes the image stored in the contents memory 382. Accordingly, the mobile terminal 210 can display the stored image on the screen of the mobile terminal 210 without using the contents player 320.

Further, the service manager 300 performs the interface function for communicating between the contents player 320 and the application 340. If the service manager 300 receives the request message for requesting the image list from the contents player 320, the service manager 300 identifies the received request message and requests the application 340 of the image list. The service manager 300 receives the image list from the application 340, and the service manager 300 transmits the response message including the received image list to the contents player 320. Further, if the service manager 300 receives the request message for copying the selected image to the contents memory 382 from the contents player 320, the service manager 300 identifies the received request message and requests the application 340 of copying the selected image to the contents memory 382. Further, if the service manager 300 receives a copy completion response from the application 340, the service manager 300 generates a copy completion response message and transmits the generated copy completion response message to the contents player 320.

If the service manager 300 requests the image list, the application 340 reads the image list stored in the memory 381 to transmit it to the contents player 320. If the request for copying the image selected by the user to the contents memory 382 is made from the service manager 300, the application 340 identifies the corresponding image in the memory 381 to copy the corresponding image to the contents memory 382. Thereafter, the application 340 notifies the service manager 300 of the completion of the copy.

In the meantime, the memory 381 includes the contents memory 382, which the contents player 320 can access, and stores the images required for modifying or editing through the contents, the image photographed by the camera, or the image downloaded through a data cable. Then, the memory 381 stores the list of the images together with the above images. Further, the contents memory 382 stores the image or data related to the contents.

The process of receiving the image selected by the user when the mobile terminal 210 including the configurations as shown in FIG. 14 according to the fourth embodiment executes the contents 310 for editing or modifying the image will be described in detail with reference to FIGS. 15A and 15B. The process after downloading the contents 310 for editing or modifying the image to the mobile terminal 210 will be described.

Figure 15A:
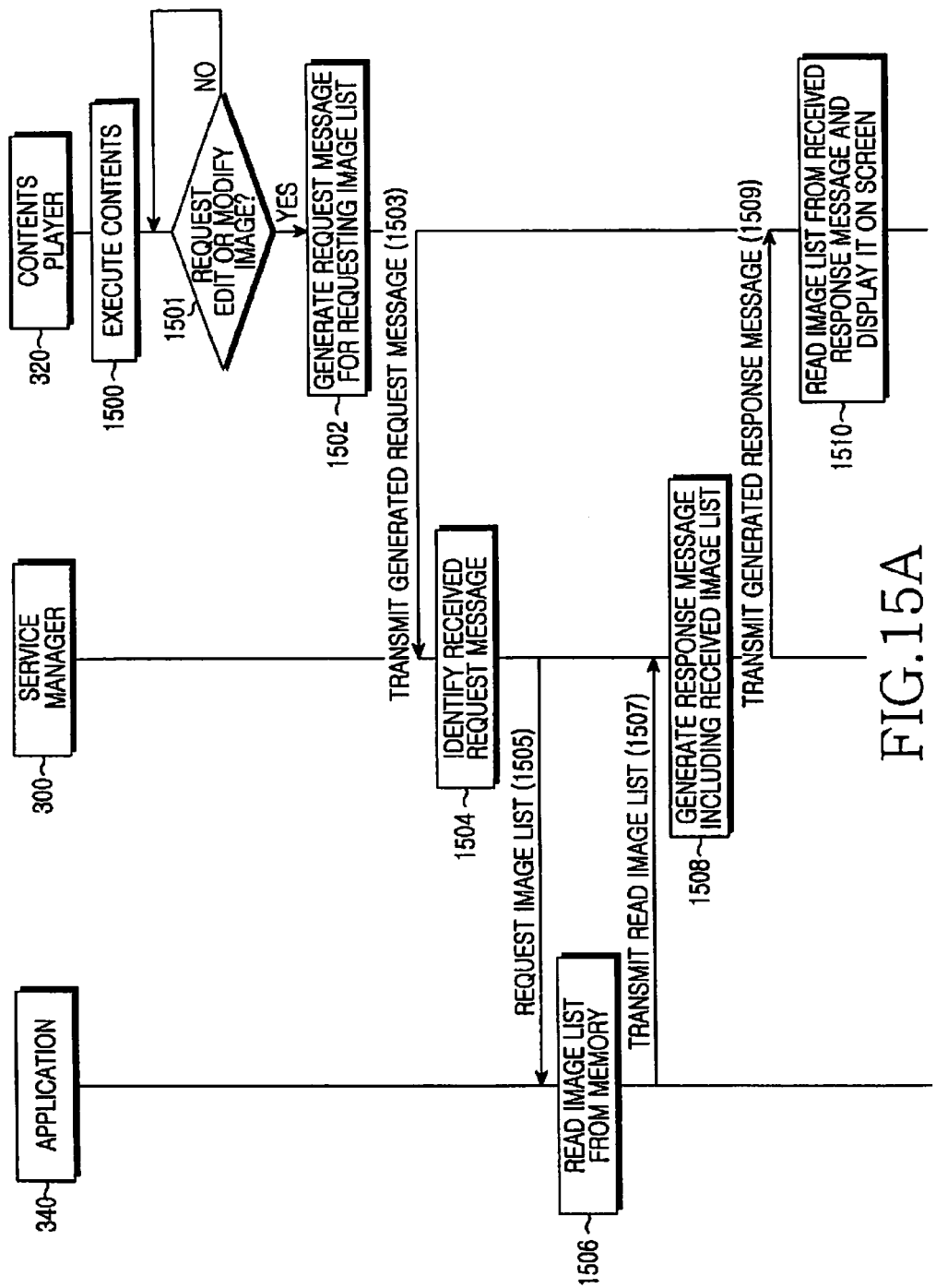
FIGS. 15A and 15B are diagrams illustrating a flow of a signal transmitted/received between a contents player and an application upon executing the contents related to the image edit and modification according to a fourth embodiment of the present invention.

In discussing the process of receiving the image list stored in the memory 381 upon executing the contents 310 for editing or modifying the image with reference to FIG. 15A, the contents player 320 executes the contents for editing or modifying the downloaded image in step 1500. The contents player 320 identifies whether the request for editing or modifying the image is made in step 1501. If the request is made, it proceeds to step 1502, but if the request is not made, the contents player 320 continuously identifies whether the request for editing or modifying the image is made in step 1501. The contents player 320 generates the request message for requesting the image list with respect to the images stored in the mobile terminal in step 1502. The contents player 320 transmits the generated request message to the service manager 300 in step 1503.

The service manager 300 identifies the received request message in step 1504, and requests the application 340 of the image list in step 1505.

The application 340 reads the image list from the memory 381 in step 1506, and transmits the read image to the service manager 300 in step 1507.

The service manager 300 generates the response message including the received image list in step 1508, and transmits the generated response message to the contents player 320 in step 1509.

The contents player 320 reads the image list from the received response message, and displays the read image list on the screen of the mobile terminal 210 in step 1510.

Figure 15B:
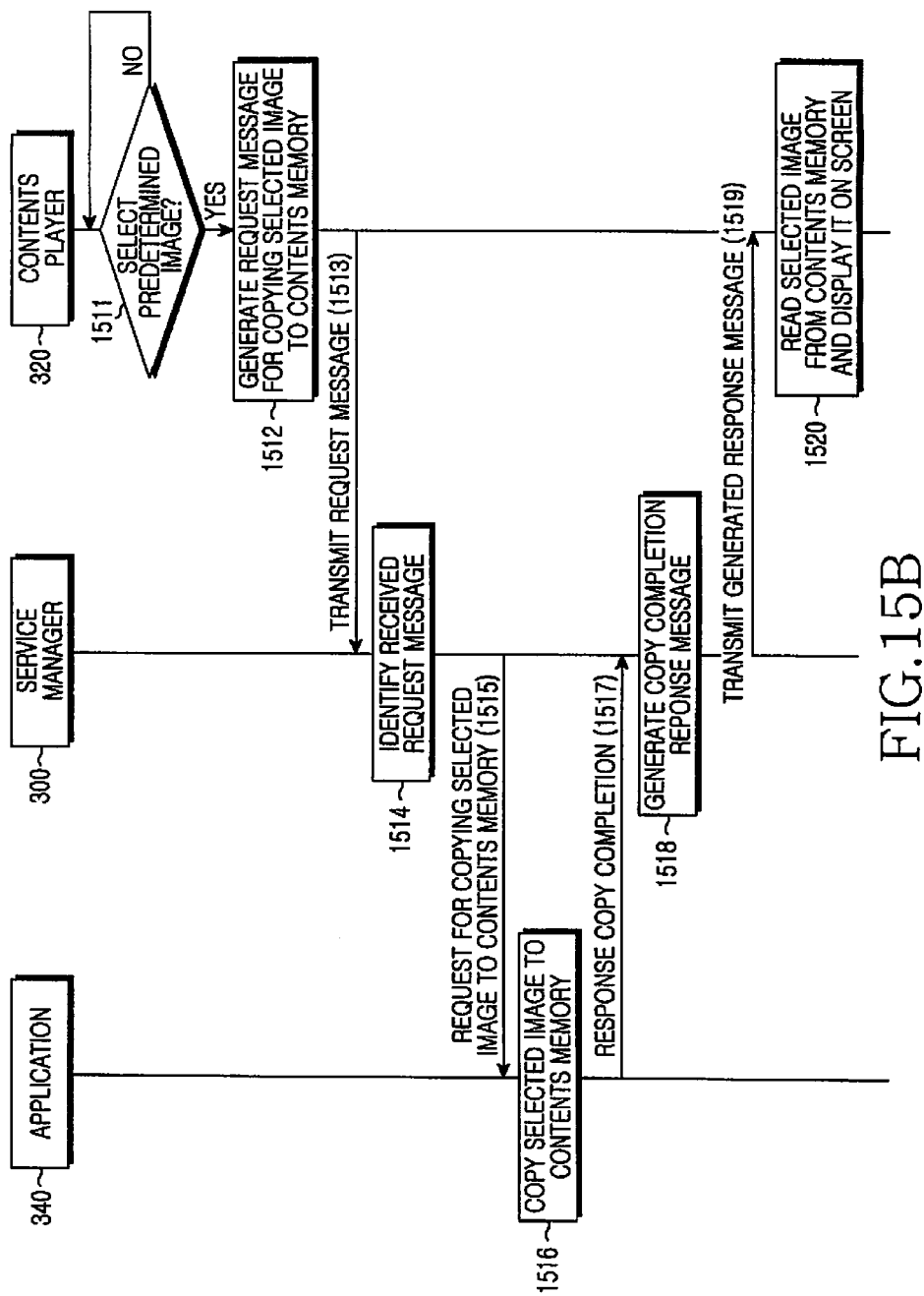

Next, in discussing the process of receiving the selected image according to the image selection with reference to FIG. 15B, the contents player 320 identifies whether the request for selecting the predetermined image is made in step 1511. If the request is made, it proceeds to step 1512, but if the request is not made, the contents player 320 continuously identifies whether the request for selecting the predetermined image is made in step 1511. The contents player 320 generates the request message for copying the selected image to the contents memory 382 which the contents player 320 can access in step 1512. Then, the contents player 320 transmits the generated request message to the service manager 300 in step 1513.

The service manager 300 identifies the received request message in step 1514, and requests the application 340 of copying the selected image to the contents memory 382 in step 1515.

The application 340 identifies the selected image in the memory 381 to copy the selected image to the contents memory 382 in step 1516, and notifies the service manager 300 of the completion of the copy in step 1517.

The service manager 300 generates the copy completion response message according to the response of the application 340 in step 1518, and transmits the generated response message to the contents player 320 in step 1519.

The contents player 320 identifies the received response message, reads the selected image from the contents memory 382, and displays the read image on the screen of the mobile terminal 210 in step 1520. Through the above processes, the user can edit or modify the selected image through the contents 310.

As described above, the present invention can grant the control function capable of controlling the function of the mobile terminal to the contents generated by the contents author using the contents authoring tool and executed in the VM or the exclusive player. Therefore, the function of the mobile terminal can be controlled through the authored contents and the user can directly produce the certain function of the mobile terminal, thereby advantageously executing the function of the mobile terminal suitable for user's taste.

While the invention has been shown and described with reference to certain preferred embodiments thereof, it will be understood by those skilled in the art that various changes in form and details may be made therein without departing from the spirit and scope of the invention as defined by the appended claims. For example, the present invention can be employed in every portable terminal.

What is claimed is:

1. A method for controlling a function in a mobile terminal using contents, the method comprising the steps of:
   storing the contents in a memory of the mobile terminal;
   registering a function included in the contents to a service table;
   requesting, when a function is called, according to whether the called function is registered in the service table, one of execution of an application related to the called function and a service related to the called function; and
   executing, when execution of the application related to the called function is requested, the application related to the called function; and
   executing, when the service related to the called function is requested, the contents related to the called function,
   wherein execution of the content related to the called function is requested when the called function is registered in the service table, and execution of the application related to the called function is requested when the called function is not registered in the service table.

2. The method as claimed in claim 1, further comprising:
   generating a service list message using a code of the content; and
   configuring the service table using the service list message.

3. The method as claimed in claim 2, wherein the service list message comprises information for processing the function included in the content.

4. The method as claimed in claim 2, wherein the service list message comprises a first field having a command for providing the function included in the content and a second field having detailed contents for the command.

5. The method as claimed in claim 2, wherein the function included in the service list message is registered to the service table so as to configure the service table.

6. The method as claimed in claim 1, wherein the function included in the content is registered to the service table when the content is installed.

7. The method as claimed in claim 1, wherein the called function is a call reception function.

8. The method as claimed in claim 1, wherein the content includes a picture.

9. The method as claimed in claim 1, wherein the content includes a moving image.

10. A mobile terminal for controlling a function using contents, the mobile terminal comprising:
   a memory for storing the contents; and
   a processor for requesting, when a function is called, according to whether the called function is registered in a service table, one of execution of an application related to the called function and a service related to the called function, executing, when execution of the application related to the called function is requested, the application related to the called function, and executing, when the service related to the called function is requested, the contents related to the called function,
   wherein execution of the content related to the called function is requested when the called function is registered in the service table, and execution of the application related to the called function is requested when the called function is not registered in the service table.

11. The mobile terminal as claimed in claim 10, wherein the processor is configured for:
   generating a service list message using a code of the content; and
   configuring the service table using the service list message.

12. The mobile terminal as claimed in claim 11, wherein the service list message comprises information for processing the function included in the content.

13. The mobile terminal as claimed in claim 11, wherein the service list message comprises a first field having a command for providing the function included in the content and a second field having detailed contents for the command.

14. The mobile terminal as claimed in claim 11, wherein the function included in the service list message is registered to the service table so as to configure the service table.

15. The mobile terminal as claimed in claim 10, wherein the function included in the content is registered to the service table when the content is installed.

16. The mobile terminal as claimed in claim 10, wherein the called function is a call reception function.

17. The mobile terminal as claimed in claim 10, wherein the content includes a picture.

18. The mobile terminal as claimed in claim 10, wherein the content includes a moving image.

* * * * *